J. G. C. MANTLE.
DISPLAY MACHINE.
APPLICATION FILED JULY 13, 1909.
1,158,258.
Patented Oct. 26, 1915.
6 SHEETS—SHEET 1.
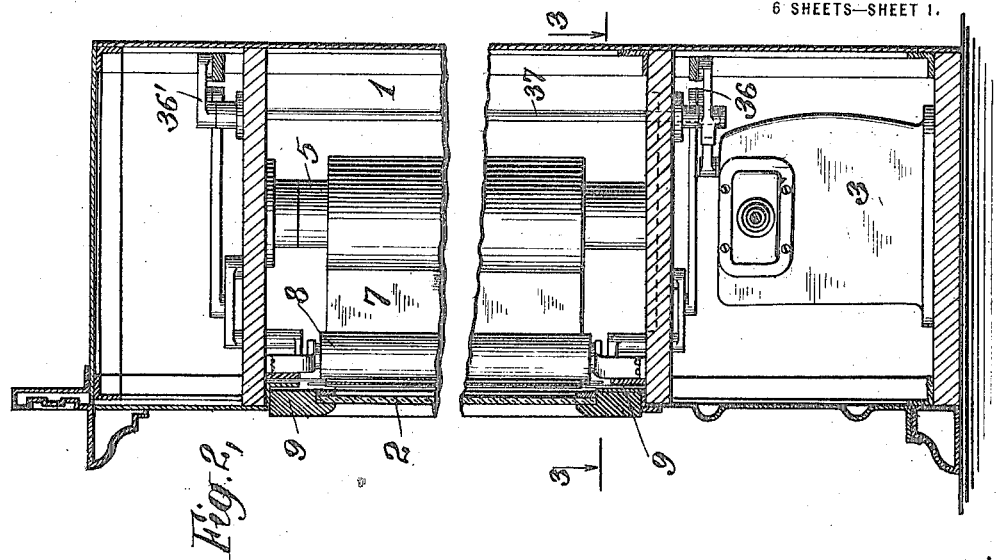
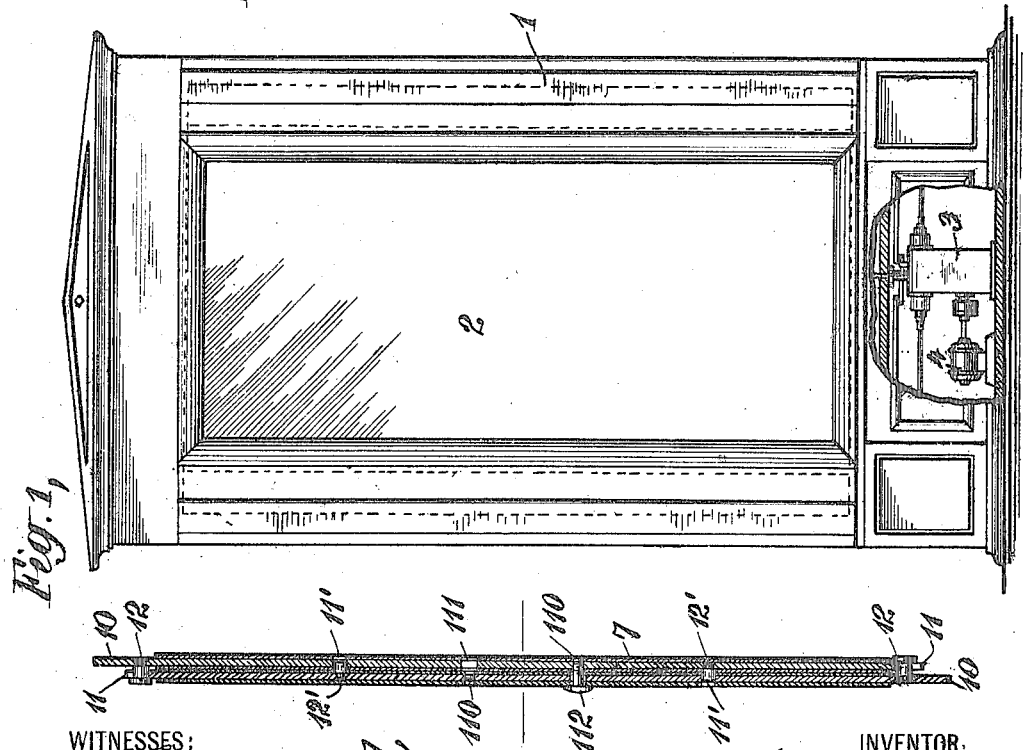

J. G. C. MANTLE.
DISPLAY MACHINE.
APPLICATION FILED JULY 13, 1909.
1,158,258.
Patented Oct. 26, 1915.
6 SHEETS—SHEET 2.
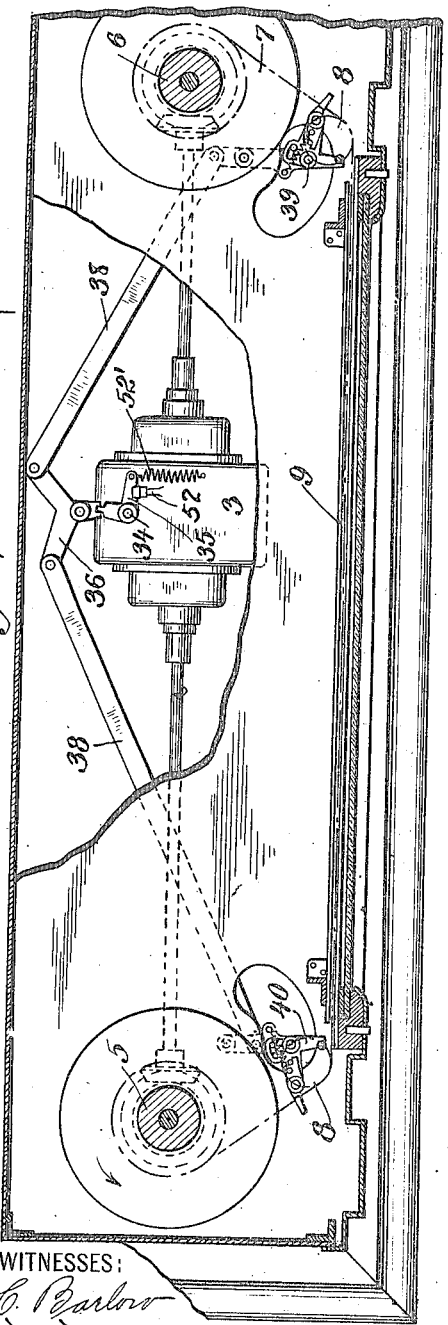
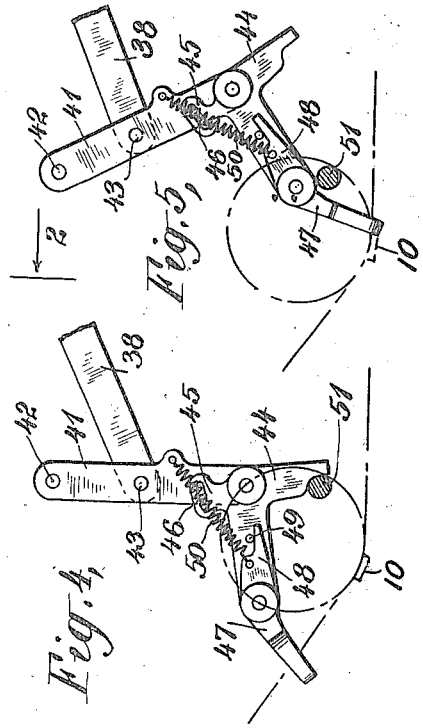
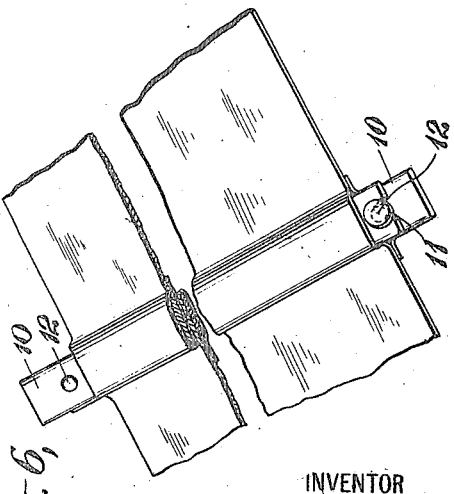
WITNESSES:
INVENTOR
Joseph G. C. Mantle
BY
ATTORNEYS

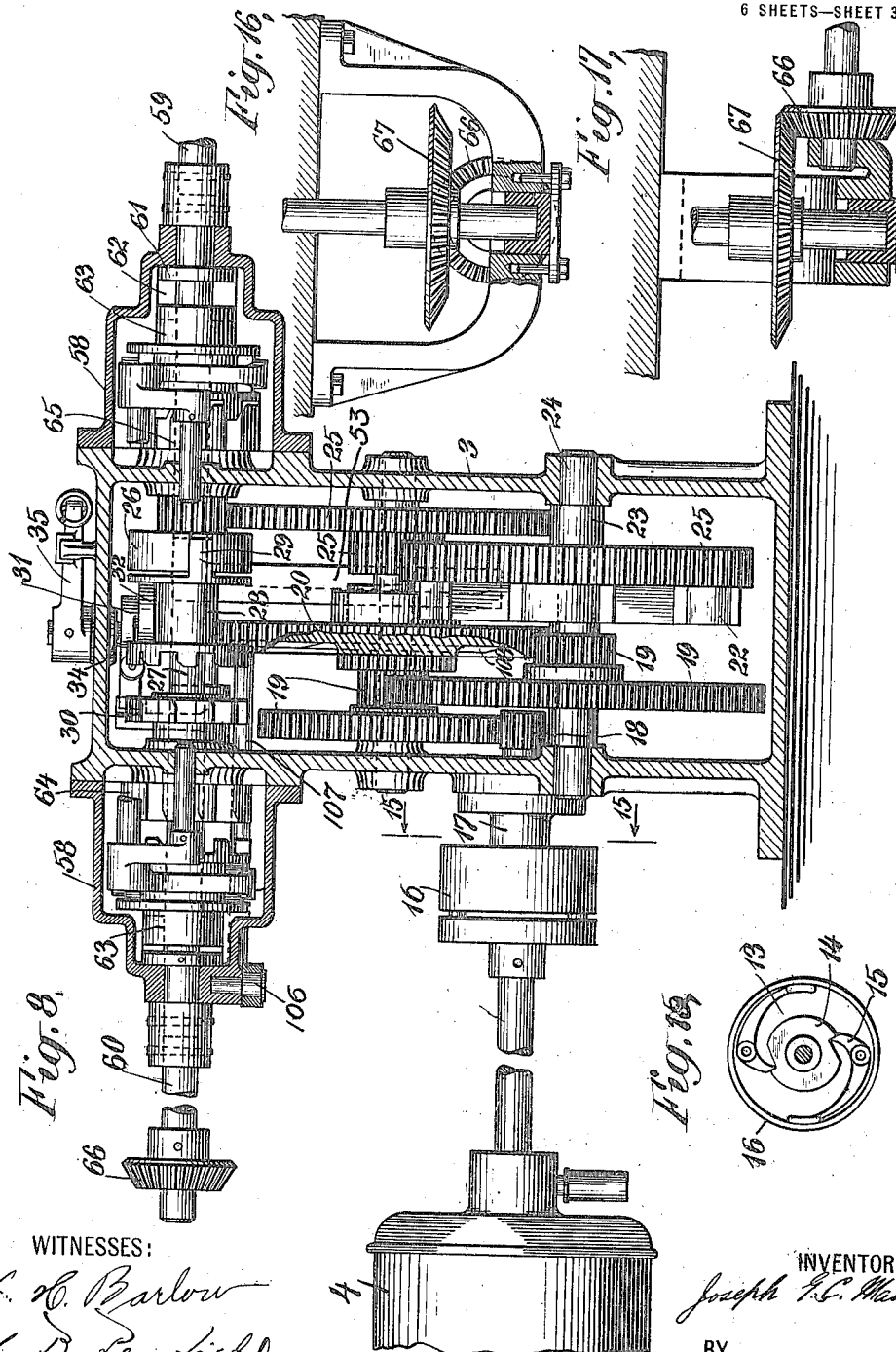

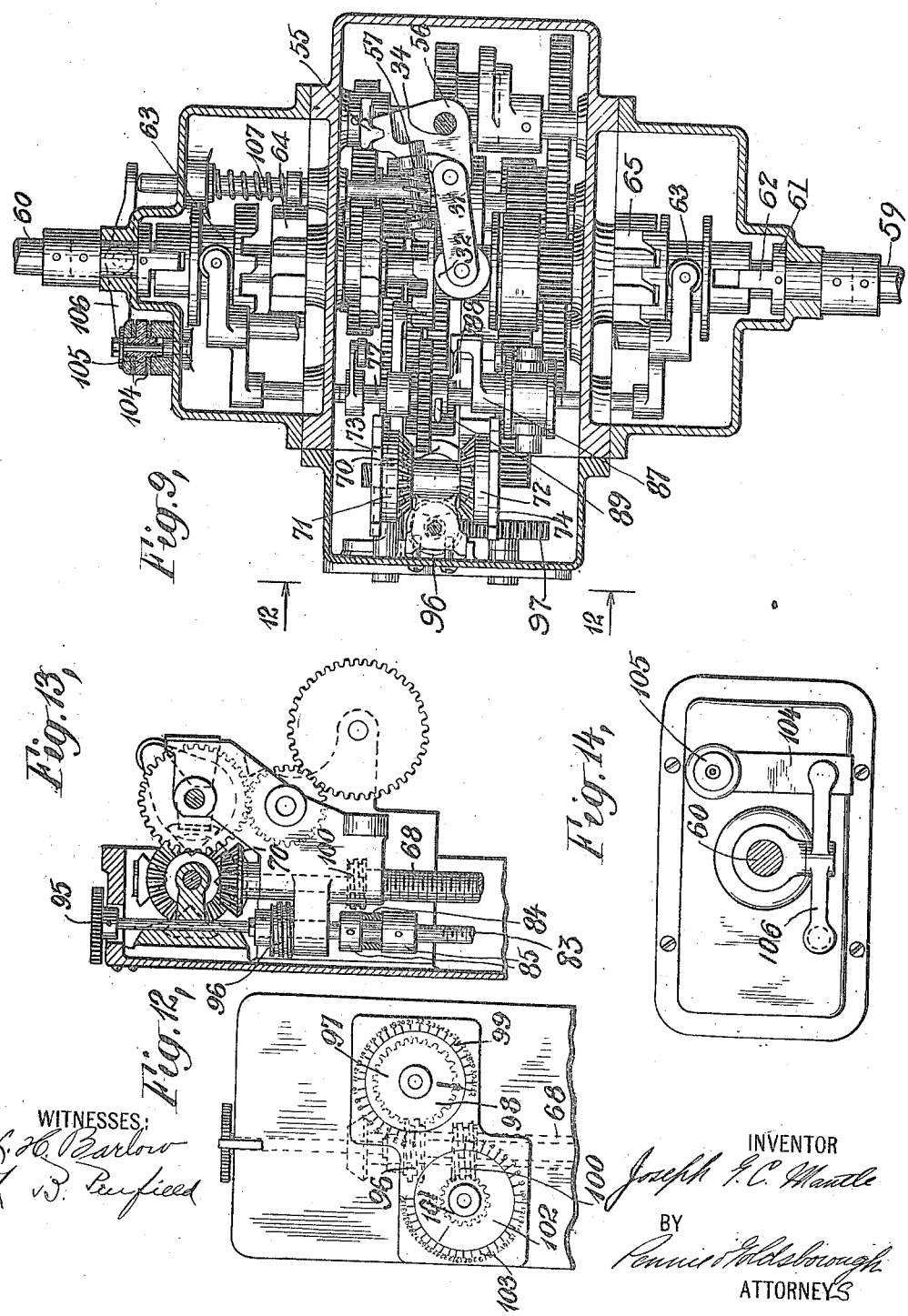

J. G. C. MANTLE.
DISPLAY MACHINE.
APPLICATION FILED JULY 13, 1909.
1,158,258.
Patented Oct. 26, 1915.
6 SHEETS—SHEET 5.
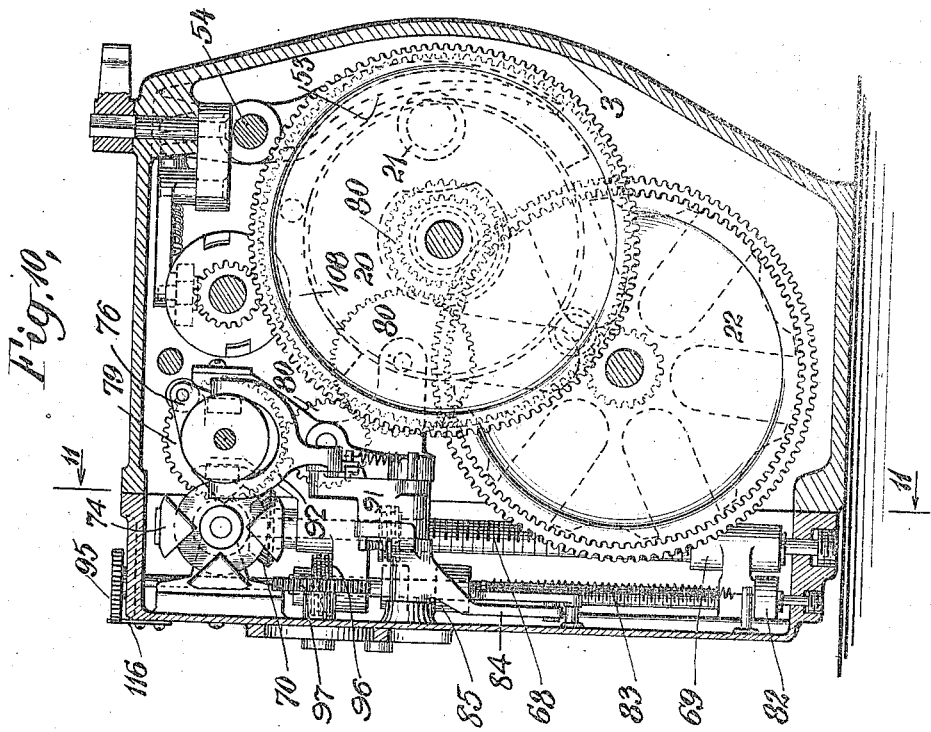
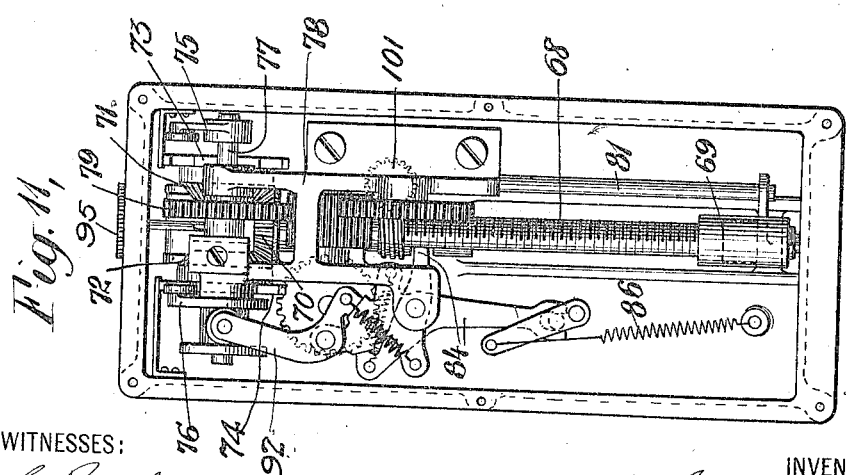
WITNESSES:
L. H. Barlow
L. B. ...
INVENTOR
Joseph G. C. Mantle
BY
Pennie & Goldsborough
ATTORNEYS

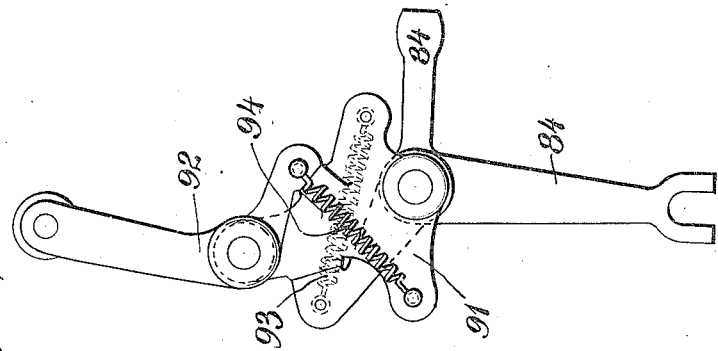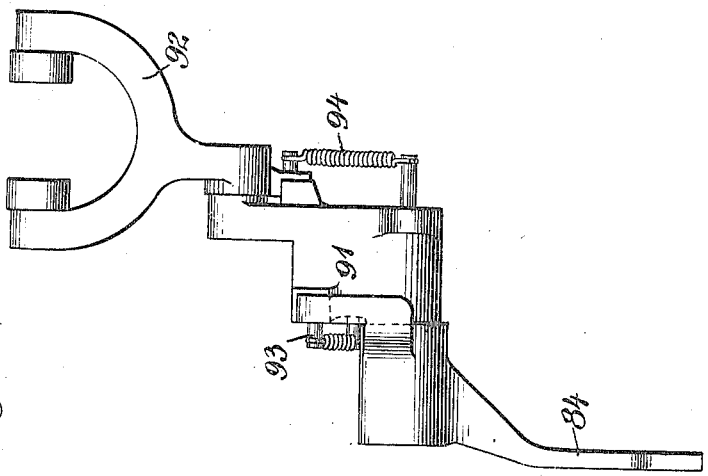

UNITED STATES PATENT OFFICE.

JOSEPH G. C. MANTLE, OF NEW YORK, N. Y.

DISPLAY-MACHINE.

1,158,258.

Specification of Letters Patent. Patented Oct. 26, 1915.

Application filed July 13, 1909. Serial No. 507,348.

*To all whom it may concern:*

Be it known that I, JOSEPH G. C. MANTLE, a citizen of the United States, residing at New York, in the county and State of New York, have invented certain new and useful Improvements in Display-Machines; and I do hereby declare the following to be a full, clear, and exact description of the invention, such as will enable others skilled in the art to which it appertains to make and use the same.

The invention relates to improvements in that class of display devices in which pictures or signs formed into or carried upon a web are given an intermittent or step-by-step movement sufficient to present them successively in a given position, as before a display opening or the like.

The object of the invention is to provide a device wholly mechanical in its construction, so as to avoid the well known troubles and uncertainties of operation incident to electrical or magnetic control, and of such character that any desired number of web elements, up to the capacity of the machine, may be brought successively into accurate registry with the display opening or the like, and may then be automatically reversed and displayed again in reverse order, and so on until the machine is intentionally stopped. Webs of the character referred to will ordinarily be made of flimsy and fragile material, and aside from the fact that it is not always convenient or possible to make the web elements of exactly the same length, such webs suffer from the defect that the material of which they are made stretches or shrinks with changes of atmospheric conditions. Because of this inherent variation in the length of the web elements, it is necessary, if accurate registry is to be attained, that the web itself should control the stoppage or disconnection of the immediate web driving mechanism. Because of the fragile character of the web, and for mechanical reasons, it is not feasible, however, to control a direct connection between the web driving mechanism and a continuously driven primary driving source by the web itself. It is, on the contrary, desirable that the whole mechanism should operate, so far as possible, independently of the web, the controlling function of the web itself being confined to the mere disconnection of the immediate driving mechanism when the web section to be displayed has arrived at the desired position of registry. To these ends I provide a driving source connected through intermittent gearing to a driving element which I will call "the primary web driving element" in such manner as to impart thereto quite independently of the web, intermittent similar direction movements, preferably of equal extent, together with transmission mechanism between this element and the web, which mechanism I will call "the secondary driving mechanism", mechanism actuated by the web for disconnecting the secondary web driving mechanism from the primary web driving element so that the range of the intermittent movements effective on the web is curtailed by the web in accordance with the exact length of the particular web section to be displayed, and mechanism independent of the web for automatically reëstablishing connection between the primary web driving element and the secondary web driving mechanism at time intervals corresponding with the intermittent movements, and preferably during each period of dwell of the primary driving element so as to avoid the jar and noise incident to the throwing of a positive clutch while the parts are rotating.

In some cases, as where a permanent web is to be displayed without change, it is sufficient that the automatic reversal of the web shall always take place after a certain fixed number of intermittent movements; but for general use, it is highly desirable that the driving mechanism may conveniently be set to display before reversal any desired number within predetermined limits, of web elements, so that webs of any desired number of elements may be displayed, or any consecutive number of web elements may be selected for display without displaying the remaining elements of the web. For such purpose, I provide means by which the mechanism may be easily and quickly set so that the web will automatically reverse upon the completion of any chosen number of intermittent movements, and so organize the mechanism that these consecutive web elements chosen for display may be at either end of the web or at any intermediate portion thereof.

It is frequently necessary to change or adjust the web or other parts in machines of the character herein referred to, and, so far as I know, it has heretofore been customary for the operator to rely entirely upon his knowledge of the parts of the machine, and their relative positions at different stages, for information which is necessary to enable him to properly start the machine again, such as the point and direction of web travel when the machine was stopped. To avoid this, and enable the operator to get such information without observation of the mechanism, I provide indicating means showing, both when the machine is working and when it is stopped, the position the mechanism has reached in its step-by-step movements; the direction of that movement; whether the web was, when the machine stopped, in motion or at rest; the number of step-by-step movements which have taken place, and the number which must take place before automatic reversal, and the number of displays for which the machine is set if it is of the adjustable type above indicated.

In the preferred form of the invention herein illustrated, the driving and reversing mechanism is exceedingly compact, so that it is possible to inclose it within a closed box adapted to be filled with a lubricant; and the connection of the mechanism to the immediate web driving shafts of the machine is such that the primary driving mechanism with its inclosing box may easily and quickly be removed for repair or for replacement by a like box without disturbing the immediate web-driving mechanism.

I have also provided a simple and convenient mechanism for automatically illuminating the web during its periods of rest.

The mechanism by which these results are accomplished in accordance with my invention will be best understood by a consideration of the following description and the accompanying drawings, which are intended to disclose the preferred form.

In the drawings like reference characters are applied to like parts throughout and Figure 1 is a front elevation of a display cabinet with a portion of the casing broken away to show the inclosed driving mechanism in elevation. Fig. 2 is a vertical section of the same parts on a larger scale, the section being taken on the line 2—2 of Fig. 3. Fig. 3 is a sectional plan on the line 3—3 of Fig. 2, the floor of the web housing being broken away to better disclose the reel-driving mechanism and the intermediate controlling mechanism, and the driving motor being omitted to simplify the illustration. Figs. 4 and 5 are detail views of the control triggers for the reversing mechanism and Figs. 6 and 7 are detail views of the manner in which I prefer to join together the over-lapping ends of the pictures or signs, which constitute the web elements, to form them into a continuous web. Fig. 8 is a vertical section of the housing of the driving mechanism showing the driving gears in elevation. Fig. 9 is a plan view of the same parts. Fig. 10 is a section through the casing showing the driving gears in side elevation and in conjunction with the adjusting mechanism. Fig. 11 is an elevation, looking in the direction of the arrows 11—11 on Fig. 10, of the removable cover of the casing and the adjusting mechanism carried thereby. Fig. 12 is a face view of the front end of the housing for the driving mechanism showing the relation of the adjusting rod and indicating dials. Fig. 13 is a detail view of a vertical section taken in a plane coincident with the axis of the adjusting rod but showing the rod and attached parts in elevation. Fig. 14 is a view of one end of the housing showing the circuit controlling mechanism for the illuminating device. Fig. 15 is a view on the line 15—15 of Fig. 8 looking in the direction of the arrows and showing the transmission clutch between the driving motor and the driving gears. Fig. 16 is a view in elevation of the lower end of one of the reel-carrying shafts showing its step bearing, Fig. 17 is a similar view taken at right angles to Fig. 16; and Figs. 18 and 19 are detail views of a shifting lever 84.

My improved mechanism is illustrated in conjunction with a display cabinet 1, provided with a display opening which usually has a protecting closure 2 of glass or the like. In the construction shown the cabinet contains in its lower portion a housing 3 for the primary driving mechanism, a driving motor illustrated at 4, the intermediate or secondary web driving mechanism and connecting rods and levers of the control triggers. Above these parts is a partition which forms the floor of the compartment which contains the reels 5 and 6, carrying the web 7, and this compartment also contains a pair of guide rollers 8 to hold the web in position before the display opening, the guide rollers being assisted in that function by longitudinal guide-ways 9 which receive the projecting ends of battens 10.

In the practical operation of that type of display machines in which the web is made up of a series of individual web-elements joined end to end it will be of great advantage to have the individual battens counterparts of one another, thus requiring but a single style of batten instead of two distinct forms constituting each coacting pair. To this end, and to provide a batten which may quickly and easily be slipped in the end loop of the web-element, and which will hold the web in place while two elements are being joined together, I have devised the construction particularly illustrated in Figs. 6 and 7. Each batten 10 has at one end a fixed headed stud 12, and at the other end a notch or recess 11. Each batten also may have one or more intermediate studs 12', and at the same distance from a point half way between stud 12 and notch 11 one or more receiving recesses 11'. For more securely fastening the two battens together, each may have at one side of the said half way point a threaded recess 110, and spaced the same distance on the other side of the said half way point the clearance hole 111, the necessary number of headed fastening pins 112, threaded at the end, being provided to pass through clearance holes 111 and engage the threads of recesses 110 to fasten the battens together. The end loops of the web-elements are correspondingly perforated so that as the battens are slipped into the loops the studs 12' slip into the recesses 11', holding the cloth in place until the battens are fastened together by studs 12 engaging notches 11, and pins 112, the threaded ends of which engage threaded recesses 110. When so fastened the end of one batten projects at one edge of the web and the end of the other batten projects at the other edge, as shown in Figs. 6 and 7, the guide-ways 9 being arranged to take the projecting batten ends as shown in Fig. 2.

The driving source for the machine is represented at 4 as an electric motor, the shaft of which carries a ratchet clutch 13 of which Fig. 15 is a face view, and from this view it will be seen that when the motor shaft is driven in a clockwise direction, as seen in Fig. 15, the clutch pinion 14 on that shaft engages the ratchet toes 15 to drive the drum 16 and the shaft which carries it, but for a relative rotation in the opposite direction the clutch disconnects. Drum 16 is carried by a stub shaft 17 journaled in the housing 3 and carrying within the housing a pinion 18 which drives through the chain of speed-reducing gears 19, the primary or driving member 20 of an intermittent gear. This member 20 carries the driving stud 21 (shown in dotted lines in Fig. 10) which stud engages during a portion of each revolution of the member 20, one of the radial guides or channels in the secondary or driven member 22 of the intermittent gear, which driven member is mounted on a rotating sleeve 23 on shaft 24, and carries the first member of a chain of speed raising gears 25 which drive the clutch member 26 free to rotate on the shaft 27. This clutch member 26 is the primary driving element above referred to and it will be seen that, by the transmitting mechanism thus far described the clutch member 26 is driven periodically through a definite range of movement, the mode of operation of the intermittent gear 20—21—22 being that as soon as stud 21 engages one of the radial guides or channels on member 22 it begins to turn that member, acting thereon at first through a long leverage and driving it at low speed. As stud 21 approaches the lower portion of its arc the effective speed increases and the leverage decreases, and as the stud rises again the speed decreases. This character of movement is admirably adapted to driving a web of the character referred to, in a step-by-step manner, because it starts the web slowly and without overloading the driving motor, gradually increases its speed, and then slows down again before the end of its movement.

For the reasons already explained, it is practically essential that the web itself should control the stoppage or disconnection of the immediate web driving mechanism. To provide for this, I interpose between the primary driving element 26 and the web, the secondary web driving mechanism which will now be described. The clutch member 26 is free to rotate on shaft 27 and co-acting with the member 26 is a spool 28 which is likewise free to rotate on the shaft, but is always in driving connection with the member 26 through the projections 29. This spool carries on the end opposite the member 26 the clutch teeth, as shown in Fig. 8, adapted to engage with the teeth of clutch member 30 secured to shaft 27, when thrown to the extreme left hand position.

The form of clutch mechanism, made up of the driving member 26, the spool 28 and the driven member 30, is of substantial importance in my apparatus, in which the clutch is shifted by the web itself. It will be observed that the engagement-driving-surfaces of this clutch mechanism are peripheral surfaces removed a substantial distance from the shaft and having a correspondingly higher speed. For a given transmitted horse power the force required to slide the engagement-driving-surfaces is inversely proportioned to the speed of the surfaces, and since this force is, in accordance with my invention, applied through the curtain itself, it is important to reduce it by thus removing the engagement-driving surfaces from the shaft and thereby increasing their velocity. This advantageous effect is increased to an important degree, in the preferred form of my invention, by imparting to the shaft 27 a higher angular velocity than would be necessary to impart the desired speed to the web, and then interposing between the shaft 27 and the web suitable speed reducing gears. In the form of the invention illustrated, the speed reducing gears consist of bevel wheels 67 on the ends of the reel shafts and engaged by pinions 66 on the ends of the transmission shafts 59 and 60. This location of the speed reducing gears has the additional advantage that the transmission shafts and associated mechanism, including the clutch members, may be made correspondingly lighter. This clutch mechanism is thrown into and out of driving engagement by means of the clutch actuating lever 31 which carries roller 32 lying between the flanges of spool 28, as illustrated in Figs. 8 and 9. Lever 31 is carried by a stub shaft 34 journaled in the top of housing 3 and carrying on the top of the housing a bell-crank lever 35 (see Fig. 3) which is rocked to shift the clutch by the web actuated mechanism illustrated particularly in Figs. 3, 4 and 5, and comprising a three-armed lever 36 secured to the lower end of upright shaft 37 (see Fig. 2) which is journaled in the floor and ceiling of that portion of the cabinet which contains the reels and web, and carries at its upper end a second lever 36'.

Each of the levers 36 and 36' has jointed to it two connecting rods 38 extending in opposite directions to the web-actuated reversing triggers 39 and 40. The construction of one of these triggers 40 is shown in detail in Figs. 4 and 5, from which it will be seen that it comprises a lever arm 41 fulcrumed at 42 and to which the connecting rod 38 is jointed at 43. Pivoted on the forward end of lever 41 is a bell-crank 44 having a heel 45 slotted at 46 to receive a pin on lever 41. Pivoted on one end of bell crank 44 is the finger 47 which is engaged, in the particular construction shown, by the projecting end of a trailing batten 10 as the web passes into such position that one of the pictures or signs is in register with the display opening. The finger 47 has a projection 48 which is normally held against pin 49 on bell-crank 44 by the spring 50 attached at one end to finger 47 and at the other end to lever 41. Fixed to the frame work of the machine in the path of the short arm of bell crank 44 is a stop 51. The bell-crank lever 35 on top of housing 3 together with the stub shaft 34 is normally drawn to the position shown in Fig. 3, in which it engages stop 52 on the housing, by a spring 52' or by other suitable means. The operation of this clutch shifting device is as follows: With the parts in the position shown in Fig. 3, a picture or sign is in register with the display opening and the members of the driving clutch within the housing 3 are in driving engagement. As the motor shaft rotates and drives primary member 20 of the intermittent gear the stud 21 comes into one of the channels of the secondary member 22 and gradually accelerates that member. This acceleration being transmitted to the member 26 and spool 28 through the gears 25, and through the clutch to the driving shaft 27, imparts to the driven web a corresponding movement. The range of movement of the primary driving element 26 is sufficient to insure a complete traverse of one web element before the display opening when the driven reel has its minimum diameter. As the web moves along, the battens 10 come into engagement with the projecting fingers 47. We will consider that the web is moving to the right in Fig. 3 and that the battens come into engagement with the fingers 47 of the triggers 40. The further movement of the web moves lever 41 on its pivot, since for a movement in the direction indicated the fingers 47 and levers 44 and 41 are in effect rigid. This movement pushes connecting rod 38 and turns lever 36 and 35 to disengage the clutch, which, of course, results in immediately stopping the driven reel. It will be understood that this disengagement takes place automatically when the web has moved into the proper position, regardless of the diameter of the driven reel, and that as the diameter of the reel increases the result is merely that during the last portion of the movement of the driven member of the intermittent gear the member 26 and spool 28 turn idly on shaft 27. It will be observed that it would be sufficient, for the actuation of the web-stopping mechanism, to have a single pair of fingers 39 and 40 arranged either at the top or at the bottom of the web, but by using two fingers 39 and two fingers 40, arranged at both the top and bottom of the web, and in such position that they engage the trailing batten, they perform a new function in that they prevent the uneven stretching of the two edges of the web which has heretofore caused great inconvenience because of the resulting uneven winding at top and bottom; they serve to stretch the web across the display opening, and they reduce the strain on the web by distributing it more evenly and by reason of the greater length of curtain between the restrained batten and the winding reel.

It is desirable to return the clutch to the engaging position while the web is at rest, so that when the driven member of the intermittent gear again begins its movement it may immediately pick up the web and start the movement of the picture or sign. It is for this purpose that I have provided the peculiar construction of triggers shown. The web will be brought to rest with the trigger in the position shown in Fig. 5, and it is necessary, in order to return the clutch to its engaging position, to withdraw the finger 47 from the path of the batten and permit the spring 52' to return the parts to the position shown in Fig. 4. To accomplish this, it is necessary to move the trigger to the right, in Figs. 4 and 5, by a pull on the connecting rod 38, and mechanism is provided for giving such a pull to the connecting rod, such mechanism comprising a curved cam finger 53 (see Fig. 10) projecting into the path of movement of the stud 21 and mounted on the transverse rocking shaft 54, which shaft carries a lever arm 55 (see Fig. 9) engaging a notch in the arm 56 carrying the clutch shifting lever 31. At the proper instant of time, before the stud 21 reënters the channel of the driven member of the intermittent gear, it strikes the cam finger 53 and turns the arm 56 and shaft 34, which turning movement is transmitted through the lever 36 to pull the connecting rod 38. This turns lever 41 further to the right, moving finger 47 away from the batten and permitting spring 50 to collapse bell crank 44 on its pivot until the pin on lever 41 engages the other end of slot 46, thereby shortening the trigger and permitting it to pass behind the batten as it is returned by the normal bias of the parts toward the left. This movement continues until the toe of the short arm of bell crank 44 strikes stop 51, whereupon the lever is straightened out again into the position shown in Fig. 4, with the finger 47 in the path of the next batten. The purpose of pivoting finger 47 on bell crank 44 is to permit it to yield when the trigger of which it forms a part is idle. That is, in the arrangement of parts just discussed, the corresponding finger on trigger 39 must yield to permit the passage of the battens moving to the right in Fig. 3. On the reverse movement of the web the trigger 39 becomes the actuating trigger and the trigger 40 is idle.

It may happen that when the clutch shifting lever 31 is shifted into the clutching position the faces of the clutch teeth will come into engagement with one another, preventing the interlocking of the clutch members until the parts begin to rotate, and it is to permit this that lever 31 is jointed onto arm 56 and is held yieldingly in its straightened position by a spring 57, as illustrated in Fig. 9.

It will be observed that in this construction, the primary driving mechanism acting through the cam finger 53, serves to withdraw and re-set the trip finger and to reestablish connection between the primary driving elements and the secondary driving mechanism during each period of dwell of the primary driving element.

The foregoing parts give the desired control of the secondary web driving mechanism by the web itself, and I will now describe the mechanism for reversing the travel of the web, and in this connection point out that the construction of my improved device is such that the winding reel is always the driven reel, the reel from which the web is being unwound remaining idle, so that the web is always under tension and is thereby straightened and kept in good condition. The shaft 27 projects through the side walls of the housing 3 into the boxes 58, each of which forms at its extremity a journal support for one of the reel-driving shafts 59 and 60. Each of these shafts carries within the box 58 a fixed collar 61 having fingers 62 projecting into slots in the hub of a sliding clutch spool 63, which carries on its other face clutch teeth adapted to engage with the clutch member 64 or 65 fast on shaft 27, and each of the reel-driving shafts 59 and 60 carries a bevel pinion 66 which pinions engage wheels 67 on the lower ends of the shafts of reels 5 and 6, so that with the parts in the position illustrated in Fig. 8, the reel 6 will be driven to move the web in one direction, and when the clutch spools 63 are shifted to their other extreme position the drum 5 will be driven to move the web in the opposite direction. The shifting of the clutch spools 63 is accomplished by the mechanism which is best illustrated in Figs. 9, 10 and 11.

Within the casing 3 is an upright screw 68 carrying a running nut 69 and driven in one direction or the other by bevel pinion 70 and the intermeshing bevel wheels 71 and 72, each of these bevel wheels 71 and 72 being connected to or made integral with the secondary member of an intermittent gear 73 or 74 similar to the gear 20—21—22, the primary or driving members of which are mounted on a shaft 77 which is slidably journaled in a bracket 78 within casing 3, and which carries a gear-wheel 79 driven by a chain of gears 80 from the intermittent gear member 20, so that for each rotation of member 20 a definite degree of rotation is given to gear 79 and consequently to worm 68 through whichever of the driving members 75 or 76 is in actuating position. Assuming that the parts are in such position that the screw 68 is rotated to move the nut 69 toward its lowest position, the nut, which is guided by a guide rod 81 on the casing, will eventually engage the stop 82 on adjusting screw 83, thereby depressing that screw and carrying down the end of three-part lever 84—91—92, which is engaged by cheek-pieces 85 on screw 83, as indicated in Fig. 13, and shifting that lever to the position shown in Fig. 11, in which it is held by spring 86, until thrown over the center when the nut 69 engages the under cheek-piece 85 at the other extremity of its movement. Such movement of lever 84—91—92, by throwing its upper forked end 92, slides shaft 77 to its other extreme position. This results in a reversal of the direction of rotation of screw 68 and the direction of movement of the nut 69, and at the same time it shifts the clutch spools 63, by means of the connection shown in Fig. 9, into the reverse position, to reverse the travel of the display web. On the stationary supporting bracket for shaft 77 is an arm 87 having a segmental gate 88 which coacts with a similar gate 89 on the hub of gear-wheel 79, to restrain the shifting of the shaft 77, when the two members of either of the associated intermittent gears are in engagement. It is to permit this restraint of the shifting movement without injury to the moving parts that lever 84 is constructed of three parts, which are shown in detail in Figs. 18 and 19, these parts being the lower part 84, the middle part 91 and the upper part 92, pivoted to one another as shown, the parts 84 and 91 being held together by a spring 93 and the parts 91 and 92 being held together by a spring 94. With this construction, when the tendency is to turn the upper part in a clockwise direction, as seen in Fig. 18, to shift shaft 77 to the right in Fig. 11, and this shifting is restrained by the gates 88 and 89, the spring 94 will yield until the gates are in position to pass one another and will then shift the shaft 77. If the tendency is to move the shaft 77 in a counterclockwise direction, the member 84 will in like manner turn on its pivot, being permitted to do so by the spring 93, which will shift the shaft 77 at the proper time. It will be seen that with this arrangement of parts the gearing is shifted to reverse the direction of movement of the web when the traveler 69 engages the stop 82, or as soon thereafter as the shifting movement is permitted by gates 88 and 89. To prevent reversal of the web when it is moving, gears 80 are so set that one or the other of the intermittent gears on shaft 77 and consequently gates 88 and 89 are always in engagement while the two members of gear 20—21—22 are driving the web. The reversing mechanism thus constituted is characterized by the fact that it is driven directly from the primary driving mechanism and is quite independent of the web, so that the primary driving mechanism will be reversed with certainty after a pre-determined number of intermittent movements of the primary driving element, independently of the extent of movement of the web; indeed, whether there is a web in the machine or not. Furthermore, it is assured that the reversal shall take place after the completion of the intermittent movement of the primary driving element, and consequently during a period of dwell of the web, so that it is impossible that the reversal should occur when a web element has been but partly exposed; and the last web element is fully exposed and displayed for the usual interval of time.

It often happens, as I have already said, that it is the desire to change the number of pictures or signs exhibited, or the length of the traveling web, but with all types of exhibiting machines with which I am familiar, it has been impossible to do this without changing the structure of the machine, and it has consequently been the practice to make concessions to advertisers to fill up the web, or in some cases, to run blank sections. It is one of the objects of my invention to provide a mechanism whereby the number of pictures or signs displayed, may be changed at will by a simple manipulation, and this is accomplished by shifting the position of the stop 82. It is to this end that shaft 83 is threaded and stop 82 is guided by the rod 81, and on the upper end of screw 83 on top of the casing is a thumb wheel 95 which may be turned at will to raise or lower the stop 82. For the purpose of indicating the number of web elements which will be exhibited during the travel of the web in each direction, I provide on the shaft 83 a worm-wheel 96 meshing with a gear 97 on a stub-shaft mounted in the face of casing 3, which stub-shaft carries on the outside of the casing a marked dial or pointer 98 surrounded by a scale 99 and for the purpose of indicating the number of web elements which have been displayed at any time, I place on worm 68 a similar worm-wheel 100 meshing with pinion 101 mounted on a stub-shaft passing through the face of casing 3 and carrying on the outside of the casing a marked dial or pointer 102 surrounded by a scale 103. It is in order that this indicating device may be moved during a small part of the period of movement of the primary driving element, leaving ample time between the movements of the indicator for the shifting movements of reversal, and thereby insuring that the indication should be definite and unmistakable, that the intermittent gearing is interposed between the primary driving mechanism and the worm 68 of the reversing mechanism. Furthermore, thumb wheel 95 has a peripheral notch engaged by spring 116 to insure the proper range of movement of adjustable stop 82 at each setting, and by reason of the fact that screw 83 is lifted in one direction of movement and depressed in the other direction of movement, the position of thumb wheel 95, up or down, with respect to the spring 116, indicates the direction in which the web is or has been moving and the direction in which it will move when the machine is started. It will be seen that all of these indicating devices are wholly independent of the web, and it is their primary function to give information in regard to the condition and sequence relation of the mechanism so that the mechanism may, before the web is inserted, be operated until it is brought into position to impart to the web, when it is inserted, the desired number, sequence and direction of movements. For instance, suppose a new web of a given number of sections is to be installed by a person who is unable to examine the mechanism within the box 3, or who is incompetent to understand the mechanism when it is exposed. In such case the dial 98 will show by its position with respect to the scale 99 the present setting of the mechanism with respect to the number of sections of web which the machine is set to display. The dial 102, by its position, with relation to scale 103 will show the sequence number of the web element which was displayed at the time when the old curtain was removed; and the position of the thumb wheel with respect to the spring 116 will show the direction in which the mechanism will drive the web. By turning the thumb wheel 95, the mechanism may be adjusted to display the number of web elements of which the new curtain is made up, or any desired consecutive number of those elements. The most convenient procedure is then to run the mechanism without the web until the pointer 102 points to the zero mark on scale 103, and then to connect the free end of the web to that reel to which the driving mechanism is connected, as indicated by the position of the thumb wheel 95 with respect to the spring 116. If it is desired to display a consecutive number of web elements less than the whole number, and located between the ends, then it is most convenient to instal the web as above described and operate it until the first web element which it is desired to display arrives at the display opening and then manipulate the lever 35 to hold the clutch member 30 out of engaging position and run the mechanism until the pointer 102 points to the zero mark of the scale 103. The direction controlling device and the device controlling the number of elements to be displayed may then be set to display the desired number of web elements. It is frequently desirable, especially when the web of a machine of this character is to be changed or adjusted, to be able to reverse the direction of travel of the web at any point in its series of step-by-step movements and the construction of reversing mechanism above described is adapted to that purpose. If the operator desires to reverse the direction of travel of the web at any point it is only necessary for him to raise the thumb wheel 95 if it is depressed, or depress it if it is raised, thereby throwing lever 84—91—92 and shifting the clutches to reverse the direction of movement of the web, and, at the same time, the direction of travel of traveling nut 69.

It is desirable to illuminate the web when it is at rest and to extinguish the light when the web is moving and to this end I provide contact fingers 104 (see Figs. 9 and 14) supported at one end on an insulated stud 105 and adapted to be pressed together by a lever 106 pivoted on a collar surrounding shaft 60 and thrown into the circuit closing position by a pin 107 the inner end of which engages with a raised cam 108 on the side of gear-member 20 (see Fig. 8), the cam being so placed that the circuit is closed while the web is at rest and is open when the web is moving.

From the foregoing it will be understood that my invention includes a number of specific features which in combination make up an efficient display device, and it will be obvious that to a large extent the individual sub-combinations of elements may be utilized separately each with its own peculiar advantage, and it will further be realized that in such a machine involving the employment of many mechanical parts it is possible to change the structural embodiment of the invention by substituting for the several parts their mechanical equivalents without departing from the spirit of the invention, or the scope of the appended claims.

What I claim is:—

1. A display device having a display web and mechanism for imparting intermittent movements to the web to display successive sections thereof, said mechanism including a primary driving element, mechanism for imparting to the said element intermittent movements, secondary driving mechanism for the web, a disengageable connection between the primary driving element and the secondary driving mechanism, and mechanism actuated by the web for disengaging said connection during an intermittent movement of the primary driving element, whereby the transmission of the intermittent movements to the web is curtailed by the web to correspond with the length of the particular section thereof to be displayed.

2. A display device having a display web and mechanism for imparting intermittent movements to the web to display successive sections thereof, said mechanism including a primary driving element, mechanism for imparting to the said element successive intermittent movements of equal extent, secondary driving mechanism for the web, a disengageable connection between the primary driving element and the secondary driving mechanism, and mechanism actuated by the web for disengaging said connection during an intermittent movement of the primary driving element whereby the transmission of the intermittent movements to the web is curtailed by the web to correspond with the length of the particular section thereof to be displayed.

3. A display device having a display web and mechanism for imparting intermittent movements to the web to display successive sections thereof, said mechanism including a primary driving element, mechanism for imparting to the said element successive gradually accelerated intermittent movements, secondary driving mechanism for the web, a disengageable connection between the primary driving element and the secondary driving mechanism, mechanism actuated by the web for disengaging said connection during an intermittent movement of the primary driving element whereby the transmission of the intermittent movements to the web is curtailed by the web to correspond with the length of the particular direction thereof to be displayed.

4. A display device having a display web and mechanism for imparting intermittent movements to the web to display successive sections thereof, said mechanism including a primary driving element, mechanism for imparting to the said element intermittent movements, secondary driving mechanism for the web, a disengageable connection between the primary driving element and the secondary driving mechanism, and mechanism actuated by the web for disengaging said connection during an intermittent movement of the primary driving element whereby the transmission of the intermittent movements to the web is curtailed by the web to correspond with the length of the particular section thereof to be displayed, and mechanism for reëngaging the connection during a period of rest of the primary driving element.

5. A display device having a display web and mechanism for imparting intermittent movements to the web to display successive sections thereof, said mechanism including a primary driving element, mechanism for imparting to the said element intermittent movements, secondary driving mechanism for the web, a disengageable connection with the primary driving element and the secondary driving mechanism, and mechanism actuated by the web for disengaging said connection during an intermittent movement of the primary driving element whereby the transmission of the intermittent movement to the web is curtailed by the web to correspond with the length of the particular section thereof to be displayed, and mechanism actuated by the driving mechanism for the primary driving element for reëngaging the connection during a period of rest of the primary driving element.

6. A display device having a display web and mechanism for imparting intermittent movements to the web to display successive sections thereof, said mechanism including a primary driving element, mechanism for imparting to the said element intermittent movements, secondary driving mechanism for the web, a disengageable connection between the primary driving element and the secondary driving mechanism and mechanism including trip fingers actuated by the web for disengaging said connection during an intermittent movement of the primary driving element whereby the transmission of the intermittent movement of the web is curtailed by the web to correspond with the length of the particular section thereof to be displayed, and mechanism for reëngaging the connection and re-setting the trip fingers during a period of rest of the primary driving element.

7. A display device having a display web and mechanism for imparting intermittent movements to the web to display successive sections thereof, said mechanism including a primary driving element, mechanism for imparting to the said element intermittent movements, secondary driving mechanism for the web, a disengageable connection between the primary driving element of the secondary driving mechanism and mechanism including trip fingers actuated by the web for disengaging said connection during an intermittent movement of the primary driving element whereby the transmission of the intermittent movement to the web is curtailed by the web to correspond with the length of the particular section thereof to be displayed, and mechanism actuated by the driving mechanism of the primary driving element for reëngaging the connection and re-setting the trip fingers during a period of rest of the primary driving element.

8. A display device having a display web, a pair of reels for the web, a driving motor, a driven shaft, and clutch members for clutching the reels alternately to the driven shaft to draw the web back and forth past a display opening, in combination with an intermittent gear adapted to start the shaft at reduced speed and to subsequently increase the speed to the desired maximum, and driving connections including a clutch between the intermittent gear and the said shaft, whereby the intermittent periods of driving of the web may be curtailed.

9. A display device having a display web, a pair of reels for the web, a driving motor, a driven shaft, and clutch members for clutching the reels alternately to the driven shaft to draw the web back and forth past a display opening, in combination with an intermittent gear adapted to start the shaft at reduced speed and to subsequently increase the speed to the desired maximum, driving connections including a clutch between the intermittent gear and the said shaft, whereby the intermittent periods of driving of the web may be curtailed, and mechanism actuated by the web for disengaging the members of the last-named clutch, whereby accurate registry of the web sections with the display opening is assured.

10. A display device having a display web, a driving means, a reel for the web, intermittent gearing and driving connections between the driving means and the primary member of the intermittent gearing in combination with a clutch having one member geared to the secondary member of the intermittent gearing and the other member geared to the said reel, and disengaging mechanism for the clutch members actuated by the web at the end of every step-by-step movement.

11. A display device having a display web, a driving means, a reel for the web, intermittent gearing and driving connections between the driving means and the primary member of the intermittent gearing, in combination with a clutch having one member geared to the secondary member of the intermittent gearing and the other member geared to the said reel, disengaging mechanism for the clutch members actuated by the web at every intermittent movement, and mechanism for restoring the clutch members to engagement during each period of rest of the web.

12. A display device having a display web, a driving means, a reel for the web, intermittent gearing and driving connections between the driving means and the primary member of the intermittent gearing, in combination with a clutch having one member geared to the secondary member and the other member geared to the said reel, disengaging mechanism for the clutch members actuated by the web at every intermittent movement, and mechanism actuated by the primary member of the intermittent gearing during each period of rest of the secondary member, for restoring the clutch members to engagement.

13. A display device having a display web and mechanism for imparting to the web intermittent movements to display successive sections thereof, said mechanism including a primary driving element, primary driving mechanism for imparting to the said element intermittent movements, reversible secondary driving mechanism controlled by the web to transmit to the web portions of the intermittent movements corresponding in duration to the length of the individual web sections to be displayed, and reversing mechanism actuated by the primary driving mechanism to automatically reverse the secondary driving mechanism after a predetermined number of intermittent movements of the primary driving element and independently of the extent of movement of the web.

14. A display device having a display web and mechanism for imparting intermittent movements to the web to display successive sections thereof, said mechanism including a primary driving element, primary driving mechanism for imparting to the said element intermittent movements, reversible secondary driving mechanism controlled by the web to transmit to the web portions of the intermittent movements corresponding in duration to the length of the individual web sections to be displayed, and reversing mechanism actuated by the primary driving mechanism to automatically reverse the secondary driving mechanism of the primary driving element and independently of the extent of movement of the web, said reversing mechanism including a hand operated element for reversing the secondary driving mechanism at will.

15. A display device having a display web and mechanism for imparting intermittent movements to the web to display successive sections thereof, said mechanism including a primary driving element, mechanism for imparting to the said element intermittent movements, secondary driving mechanism for the web including speed reducing gearing, a trip clutch between the primary driving element and the secondary driving mechanism, said clutch having a greater angular velocity than would be required to drive the web at the desired speed and mechanism actuated by the web for disengaging said clutch during an intermittent movement of the primary driving element whereby the transmission of the intermittent movements to the web is curtailed by the web to correspond with the length of the particular section thereof to be displayed.

16. A display device having a display web and mechanism for imparting intermittent movements to the web to display successive sections thereof, said mechanism including a primary driving element, mechanism for imparting to the said element intermittent movements, secondary driving mechanism for the web including speed reducing gearing, a trip clutch whose engagement driving surfaces are peripherally arranged between the primary driving element and the secondary driving mechanism, said clutch having greater angular velocity than would be required to drive the web at the desired speed, and mechanism actuated by the web for disengaging said clutch during an intermittent movement of the primary driving element whereby the transmission of the intermittent movement to the web is curtailed by the web to correspond with the length of the particular section thereof to be displayed.

17. A display device having a display web and mechanism for imparting intermittent movements to the web to display successive sections thereof, said mechanism including a primary driving element, mechanism for imparting to the said element intermittent movements, secondary driving mechanism for the web, a trip clutch whose engagement driving surfaces are peripherally arranged, between the primary driving element and the secondary driving mechanism and mechanism actuated by the web for disengaging said clutch during an intermittent movement of the primary driving element whereby the transmission of the intermittent movements to the web is controlled by the web to correspond with the length of the particular section thereof to be displayed.

18. In a display device having a display web, mechanism for imparting intermittent movements to the web, including a web actuated clutch having a greater angular velocity than would be required to drive the web at the desired speed, and speed reducing gearing between the clutch and the web.

19. In a display device having a display web, mechanism for imparting intermittent movements to the web, including a web actuated clutch whose engagement driving-surfaces are peripherally arranged, and having greater angular velocity than would be required to drive the web at the desired speed, and speed reducing gearing between the clutch and the web.

20. In a display device having a display web, mechanism for imparting intermittent movements to the web, including a web actuated clutch whose engagement driving surfaces are peripherally arranged.

21. In a display device having a display web and mechanism for imparting intermittent movements to the web, means for curtailing the range of the individual movements in accordance with the lengths of the web sections to be displayed, including a disconnecting mechanism and an actuating finger therefor projecting into the path of the web to be engaged and moved thereby, the parts being so arranged that the finger is engaged by the trailing end of the displayed portion of the web.

22. In a display device having a display web and mechanism for imparting thereto intermittent movements, means for curtailing the range of the individual movements in accordance with the length of the web sections to be displayed including a disconnecting mechanism and two actuating fingers therefor projecting respectively at the two edges of the web into the path thereof to be engaged and moved thereby, the parts being so arranged that the fingers are engaged by the trailing end of the displayed portion of the web.

23. A display device having a display web, a driving means, a reel for the web, and connections including a clutch between the driving means and the reel for driving the web intermittently, in combination with a disengaging mechanism for the clutch members actuated by the web at every intermittent movement and mechanism for restoring the clutch members to engagement during each period of rest of the web.

24. A display device having a display web, a driving means, a reel for the web, and connections including a clutch between the driving means and the reel for driving the web intermittently, in combination with disengaging mechanism for the clutch members including an actuating finger projected into the path of the web to be engaged and moved thereby at every intermittent movement, and mechanism for withdrawing the finger from the path of the web and returning it to its initial position during each period of rest of the web.

25. A display device having a traveling display web, mechanism for moving the web step-by-step to display successive sections thereof, and a controlling trigger for the web comprising an arm, an elbow lever having a limited pivotal movement on the arm, a spring tending to turn the lever on its pivot into collapsed position, a finger on the elbow lever, means for normally holding the elbow lever with the finger projecting into the path of the web, against the action of said spring, whereby the finger is engaged and moved by the web, and mechanism for moving the arm ahead of the web when the web is at rest to permit the trigger to collapse, and for then returning the trigger to its normal position.

26. A display device having a traveling display web, mechanism for moving the web step-by-step to display successive sections thereof, and reversing mechanism actuated automatically after a predetermined number of intermittent movements of the web in one direction to reverse its direction of travel, said automatic reversing mechanism being operable by hand to reverse the direction of travel at will, and means for withholding the reversal until the web has come to rest.

27. A display device having a traveling web and reversing mechanism therefor including a double clutch, a reversing lever for shifting the clutch, and a traveler to actuate the lever, said lever being yielding in both directions to permit the continued movement of the traveler until the clutch members come into proper interlocking position.

28. The combination with mechanism for driving a display web in a step-by-step manner and adjustable mechanism for automatically reversing the direction of travel at any chosen point in its number of movements, of indicating mechanism actuated thereby to show the point which said driving mechanism has reached in its number of movements and the chosen position of adjustment of the automatic reversing mechanism.

29. The combination with mechanism for driving a display web in a step-by-step manner and adjustable mechanism for automatically reversing the direction of travel at any chosen point in its number of movements, of indicating mechanism actuated thereby to show the point which said driving mechanism has reached in its number of movements, its direction of drive and the chosen position of adjustment of the automatic reversing mechanism.

30. A display device having a display web and mechanism for imparting intermittent movements to the web to display successive sections thereof, said mechanism including a primary driving element, primary driving mechanism for imparting to the said element a series of similar direction intermittent movements, and secondary driving mechanism controlled by the web to transmit to the web portions of the intermittent movements corresponding in duration to the length of the individual web sections to be displayed, in combination with a position indicating device actuated by the primary driving mechanism and showing the position which the primary driving mechanism has reached in the series of similar direction movements.

31. A display device having a display web and mechanism for imparting intermittent movements to the web to display successive sections thereof, said mechanism including a primary driving element, primary driving mechanism for imparting to the said element successive similar direction intermittent movements, reversible secondary driving mechanism controlled by the web to transmit to the web portions of the intermittent movements corresponding in duration to the length of the individual web sections to be displayed, in combination with a direction indicating device showing the direction of drive of the secondary driving mechanism and a position indicating device showing the position which the primary driving mechanism has reached in the series of similar direction movements.

32. A display device having a display web and mechanism for imparting intermittent movements to the web to display successive sections thereof, said mechanism including a primary driving element, primary driving mechanism for imparting to the said element successive similar direction intermittent movements, reversible secondary driving mechanism controlled by the web to transmit to the web portions of the intermittent movements corresponding in duration to the length of the individual web sections to be displayed, and adjustable mechanism for automatically reversing the direction of drive of the secondary driving mechanism at any chosen point in the series of similar direction movements, in combination with a direction indicating device showing the direction of drive of the secondary driving mechanism, a position indicating device showing the position which the mechanism has reached in the series of similar direction movements, and an adjustment indicating device showing the chosen position of adjustment of the automatic reversing mechanism.

33. In a display apparatus having a framework, a traveling member, a plurality of winding rollers therefor, mechanism for driving such rollers intermittently and independently, devices carried by the traveling member and projecting from the edge thereof, a lever arranged to be engaged by such devices, a second lever mounted on the framework, a rod connecting said levers, and means whereby such second lever may disconnect the driving mechanism from the winding rollers.

34. A display device having a display web and mechanism for imparting intermittent movements to the web to display successive sections thereof, said mechanism including a primary driving element, primary driving mechanism for imparting to the said element intermittent movements, reversible secondary driving mechanism controlled by the web to transmit to the web portions of the intermittent movements corresponding in duration to the length of the individual web sections to be displayed, a reversing mechanism actuated by the primary driving element to automatically reverse the secondary driving mechanism after a predetermined number of intermittent movements of the primary driving element and independently of the extent of movement of the web, and a manually operable device for adjusting the reversing mechanism to change the number of intermittent movements between reversals.

35. A display device having a display web and mechanism for imparting intermittent movements to the web to display successive sections thereof, said mechanism including a primary driving element, primary driving mechanism for imparting to the said element intermittent movements, reversible secondary driving mechanism controlled by the web to transmit to the web portions of the intermittent movements corresponding in duration to the length of the individual web sections to be displayed, a reversing mechanism actuated by the primary driving element to automatically reverse the secondary driving mechanism after a predetermined number of intermittent movements of the primary driving element and independently of the extent of movement of the web, a manually operable device for adjusting the reversing mechanism to change the number of intermittent movements between reversals, and an adjustment indicating device showing the chosen position of adjustment of the mechanism.

In testimony whereof I affix my signature, in presence of two witnesses.

JOSEPH G. C. MANTLE.

Witnesses:
 WILLIAM H. DAVIS,
 LAURA B. PENFIELD.